United States Patent [19]
Burns

[11] Patent Number: 6,076,646
[45] Date of Patent: Jun. 20, 2000

[54] SELF-CONTAINED HYDRAULIC COUPLING

[75] Inventor: Timothy M. Burns, Jordan, N.Y.

[73] Assignee: New Venture Gear, Inc., Troy, Mich.

[21] Appl. No.: 09/176,807

[22] Filed: Oct. 22, 1998

[51] Int. Cl.[7] .................................................. F16D 25/02
[52] U.S. Cl. .................................. 192/85 AA; 192/70.12;
192/70.2; 192/103 F; 192/113.34
[58] Field of Search ............................... 192/70.12, 70.2,
192/85 AA, 103 F, 113.34, 35; 475/88

[56] References Cited

U.S. PATENT DOCUMENTS

| | | |
|---|---|---|
| 5,148,900 | 9/1992 | Mohan . |
| 5,221,101 | 6/1993 | Okubo et al. ............................ 180/247 |
| 5,234,091 | 8/1993 | Kobayashi et al. ................. 192/85 CA |
| 5,310,388 | 5/1994 | Okcuoglu et al. . |
| 5,358,454 | 10/1994 | Bowen et al. . |
| 5,536,215 | 7/1996 | Shaffer et al. . |
| 5,595,214 | 1/1997 | Shaffer et al. . |
| 5,611,746 | 3/1997 | Shaffer . |
| 5,649,459 | 7/1997 | Murakami et al. . |
| 5,704,863 | 1/1998 | Zalewski et al. . |
| 5,779,013 | 7/1998 | Bansbach . |
| 5,827,145 | 10/1998 | Okcuoglu . |

*Primary Examiner*—Charles A Marmor
*Assistant Examiner*—Saúl Rodriguez
*Attorney, Agent, or Firm*—Harness, Dickey & Pierce, P.L.C.

[57] ABSTRACT

A hydraulic coupling for use in motor vehicle driveline applications to limit speed differentiation and transfer drive torque between two rotary members. The hydraulic coupling includes a multi-plate clutch assembly operably connecting the two relatively rotatable members, and a sealed actuator assembly for actuating the clutch assembly in response to the magnitude of speed differentiation between the two rotary members. The actuator assembly includes a hydraulic pump and a piston which are sealed relative to the clutch assembly. The sealed actuator assembly includes an internal recirculation path for supplying hydraulic fluid retained therein between a low pressure supply chamber at the inlet side of the hydraulic pump and a high pressure piston chamber provided at the discharge side of the hydraulic pump. Hydraulic pressure in the piston chamber controls the magnitude of the clutch engagement force exerted by the piston on the clutch assembly. As a further feature, the recirculation path includes a flow restrictor which provides a bleed flow path for supplying high pressure fluid from the piston chamber to the supply chamber following cessation of the pumping action to release the clutch assembly.

22 Claims, 5 Drawing Sheets

6,076,646

SELF-CONTAINED HYDRAULIC COUPLING

BACKGROUND OF THE INVENTION

The present invention relates generally to hydraulic couplings for use in motor vehicle driveline applications. More specifically, the hydraulic coupling includes a transfer clutch operatively coupled between a pair of rotary members, and a sealed clutch actuator assembly for actuating the transfer clutch.

Hydraulic couplings are used in a variety of motor vehicle driveline applications for limiting slip and transferring drive torque between a pair of rotary members. In all wheel drive applications, hydraulic couplings have been used to automatically control the transfer of drive torque from a driven member to a non-driven member in response to speed differentiation therebetween. In limited slip applications, such as used in association with a differential in an axle assembly, fulltime transfer case, or transaxle, hydraulic couplings have been used to limit slip and bias the torque split between two rotary members. Examples of known hydraulic couplings which are adaptable for such driveline applications include viscous couplings, geared traction units, and passively and electronically-controlled hydraulically-actuated friction clutches generally similar to those shown and described in U.S. Pat. Nos. 5,148,900, 5,358,454, 5,649,459, 5,704,863 and 5,779,013.

Due to the advent of increased consumer demand for motor vehicles with traction control systems, hydraulic couplings are currently being used in a variety of driveline applications. Nevertheless, such hydraulic couplings are still susceptible to improvements that may enhance their performance and cost. With this in mind, a need exists to develop improved hydraulic couplings which advance the art.

SUMMARY OF THE INVENTION

Accordingly, it is an object of the present invention to provide a hydraulic coupling for use in motor vehicle driveline applications for limiting speed differentiation and torque transfer between two rotary members.

In accordance with this object, the hydraulic coupling includes a multi-plate clutch assembly operably connecting two relatively rotatable members, and a self-contained actuator assembly for actuating the clutch assembly in response to the magnitude of speed differentiation between the two rotary members. The actuator assembly includes a hydraulic pump and a piston which are sealed relative to the clutch assembly. The sealed actuator assembly includes an internal recirculation path for supplying hydraulic fluid retained therein between a low pressure supply chamber at the inlet side of the hydraulic pump and a high pressure piston chamber provided at the discharge side of the hydraulic pump. Hydraulic pressure in the piston chamber controls the magnitude of the clutch engagement force exerted by the piston on the clutch assembly.

As a further feature of the hydraulic coupling, the recirculation path includes a flow restrictor for regulating the hydraulic pressure at which the actuator assembly actuates the clutch assembly and the aggressiveness with which torque is transferred in response to speed differentiation. The flow restrictor further provides a bleed flow path to route high pressure fluid from the piston chamber to the supply chamber following cessation of the pumping action to release the clutch assembly.

As yet another feature of the hydraulic coupling, a lube pump can be provided for lubricating and cooling the clutch assembly. Furthermore, the sealed actuator assembly can be equipped with thermal compensating control valves to accommodate viscosity changes and/or pressure relief valves for preventing overpressure conditions.

BRIEF DESCRIPTION OF THE DRAWINGS

Further objects, features and advantages of the present invention will become readily apparent from the following detailed specification and the appended claims which, in conjunction with drawings, set forth the best mode now contemplated for carrying out the invention. Referring to the drawings:

DETAILED DESCRIPTION OF THE INVENTION

Figure 1:
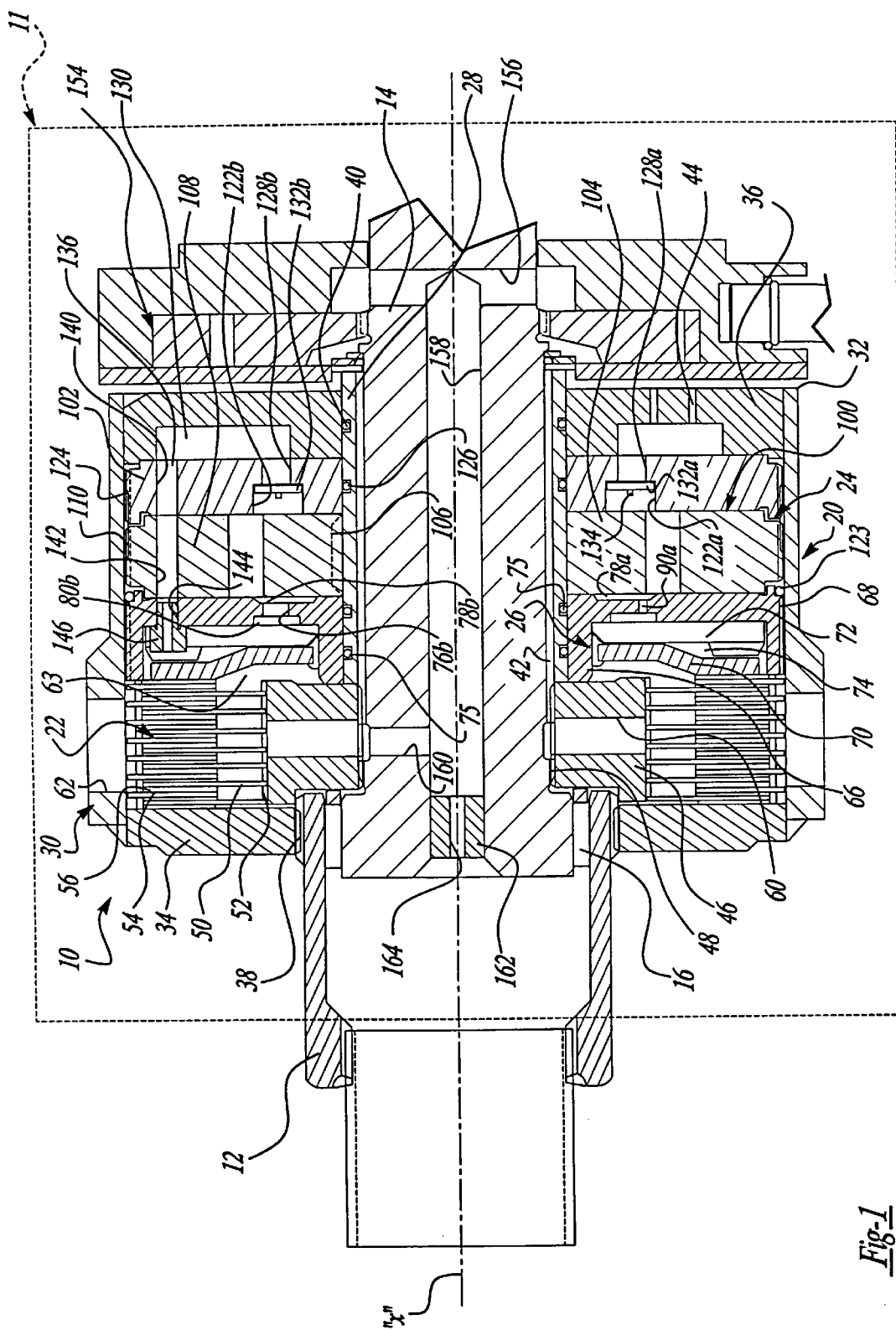
FIG. 1 is a sectional view illustrating a hydraulic coupling according to one embodiment of the present invention operatively coupled between first and second rotary shafts.

In general, the present invention is directed to a hydromechanical limited slip and torque transfer apparatus, hereinafter referred to as a hydraulic coupling. Driveline applications for the hydraulic coupling include, but are not limited to, limited slip axle differentials, power take-offs and in-line coupling for all wheel drive vehicles, on-demand couplings and limited slip differentials in four-wheel drive transfer cases, and limited slip differentials in transaxles.

Referring initially to FIGS. 1–5 of the drawings, a hydraulic coupling according to the preferred embodiment of the present invention is generally identified with reference numeral 10. As specifically shown in FIG. 1, hydraulic coupling 10 is located in a driveline apparatus 11 and is operatively coupled between a first rotary member, hereinafter referred to as first shaft 12, and a second rotary member, hereinafter referred to as second shaft 14. Shafts 12 and 14 are rotatable relative to one another, with first shaft 12 being supported by bearing 16 for rotation relative to second shaft 14. As will become apparent below, hydraulic coupling 10 is adapted to automatically and progressively couple shafts 12 and 14 in response to rotational speed differences therebetween.

In general, hydraulic coupling 10 is illustrated to include a self-contained or "sealed" actuator assembly 20 operably arranged to actuate a transfer clutch 22 for automatically and progressively transferring drive torque to the slower rotating shaft in response to excessive speed differentiation therebetween. Actuator assembly 20 includes a hydraulic pump 24 and a piston assembly 26 which are mounted on a tubular drive shaft 28. Transfer clutch 22 is a hydraulically-actuated multi-plate clutch assembly. Both actuator assembly 20 and transfer clutch 22 are confined within a cover assembly 30. Cover assembly 30 includes a cylindrical outer drum 32 and first and second cover plates 34 and 36, respectively, secured (i.e., welded) thereto. First cover plate 34 is shown fixed via a splined connection 38 to first shaft 12 such that cover assembly 30 drives or is driven by first shaft 12. An O-ring seal 40 permits second cover plate 36 of cover assembly 30 to rotate relative to drive shaft 28 while providing a fluid-tight seal therebetween. In addition, drive shaft 28 is fixed via a splined connection 42 to second shaft 14. A removable plug 44 is secured in a fill bore 45 formed in second cover plate 36 for permitting actuator assembly 20 to be filled with a desired type of hydraulic fluid. Since actuator assembly 20 is sealed relative to the remainder of hydraulic coupling, a preferred type of hydraulic fluid can be used which is different than the hydraulic lubricant entrained in the sump of driveline apparatus 11.

Transfer clutch 22 includes a clutch hub 46 fixed via a splined connection 48 to second shaft 14, and an interleaved clutch pack comprised of a plurality of inner clutch plates 50 fixed via splined connection 52 to clutch hub 46. Inner clutch plates 50 are alternately interleaved with a plurality of outer clutch plates 54 fixed via a splined connection 56 to outer drum 32. Lubrication ports 60 and 62 formed through clutch hub 46 and outer drum 32, respectively, are provided for supplying an adequate supply of lubricating fluid to a clutch chamber 63 for cooling the clutch pack.

Piston assembly 26 is comprised of a piston housing 66 that is fixed via a splined connection 68 for rotation with outer drum 32, and an actuation member or piston 70 disposed in an annular piston chamber 72 formed in piston housing 66. Preferably, piston 70 has a cover material 74 bonded thereto, such as rubber, to provide for sealed sliding engagement with respect to inner and outer edge surfaces of piston chamber 72. Thus, piston 70 is supported for axial sliding movement within piston chamber 72 relative to the interleaved multi-plate clutch pack for applying a compressive clutch engagement force thereon, thereby transferring drive torque from second shaft 14 (via clutch hub 46) to first shaft 12 (via cover assembly 32) or vise versa. The amount of drive torque transferred is progressive in that it is proportional to the magnitude of the clutch engagement force exerted by piston 70 on the clutch pack which, in turn, is a function of the fluid pressure within piston chamber 72. In this regard, the magnitude of the fluid pressure delivered by hydraulic pump 24 to piston chamber 72 is largely a function of the speed differential (i.e., "ARPM") between first shaft 12 and second shaft 14. As seen, a pair of O-ring seals 75 are provided for sealing piston housing 66 for rotation relative to drive shaft 28. Moreover, piston 70 functions to maintain a fluid-tight seal between piston chamber 72 and clutch chamber 63, thereby sealing actuator assembly 20 relative to transfer clutch 22. Furthermore, a sealed actuator chamber is formed between piston chamber 72 and a supply chamber 130 formed in second cover plate 36 within outer drum 32.

Piston housing 66 has a valving arrangement associated therewith that is operable for controlling the delivery of fluid under pressure from hydraulic pump 24 to piston chamber 72. In particular, a pair of transfer ports 76a and 76b are formed through piston housing 66 and extend between and communicate with a corresponding one of pump outlet slots 78a and 78b and piston inlet slots 80a and 80b. In addition, a check valve 82 is mounted by rivets 84 in a shallow bridge groove 86 which communicates with both piston inlet slots 80a and 80b. Preferably, check valve 82 is a reed valve element that is symmetrical relative to a central alignment tab 88. Based on the direction of relative rotation between shafts 12 and 14 (which results in a corresponding directional rotation of hydraulic pump 24 in a first direction), one terminal end 83a of reed valve 82 will resiliently deflect to an "open" position away from piston housing 66 and its corresponding transfer port 76a due to the pumping action of hydraulic pump 24 for permitting the flow of high pressure hydraulic fluid from the corresponding pump outlet slot 78a into piston chamber 72. Concurrently, the other terminal end 83b of reed valve 82 is maintained in a "closed" position relative to piston housing 66 for inhibiting the discharge of the high pressure hydraulic fluid from piston chamber 72 into the other pump outlet slot 78b through transfer port 76b. As such, when the hydraulic fluid in piston chamber 72 exceeds a predetermined pressure level, piston 70 is actuated to move toward the clutch pack for applying the resultant clutch engagement force thereon, thereby engaging transfer clutch 22. During the opposite direction of relative rotation between shafts 12 and 14, the open and closed positions mentioned above are reversed for transfer ports 76a and 76b. Upon cessation of the pumping action, both terminal ends 83a and 83b of check valve 82 are biased to return to their respective closed positions for maintaining a supply of fluid in piston chamber 72. Thus, reed valve 82 functions as a normally-closed check valve. Obviously, separate check valves can be used in association with transfer ports 76a and 76b if so desired.

Figure 2:
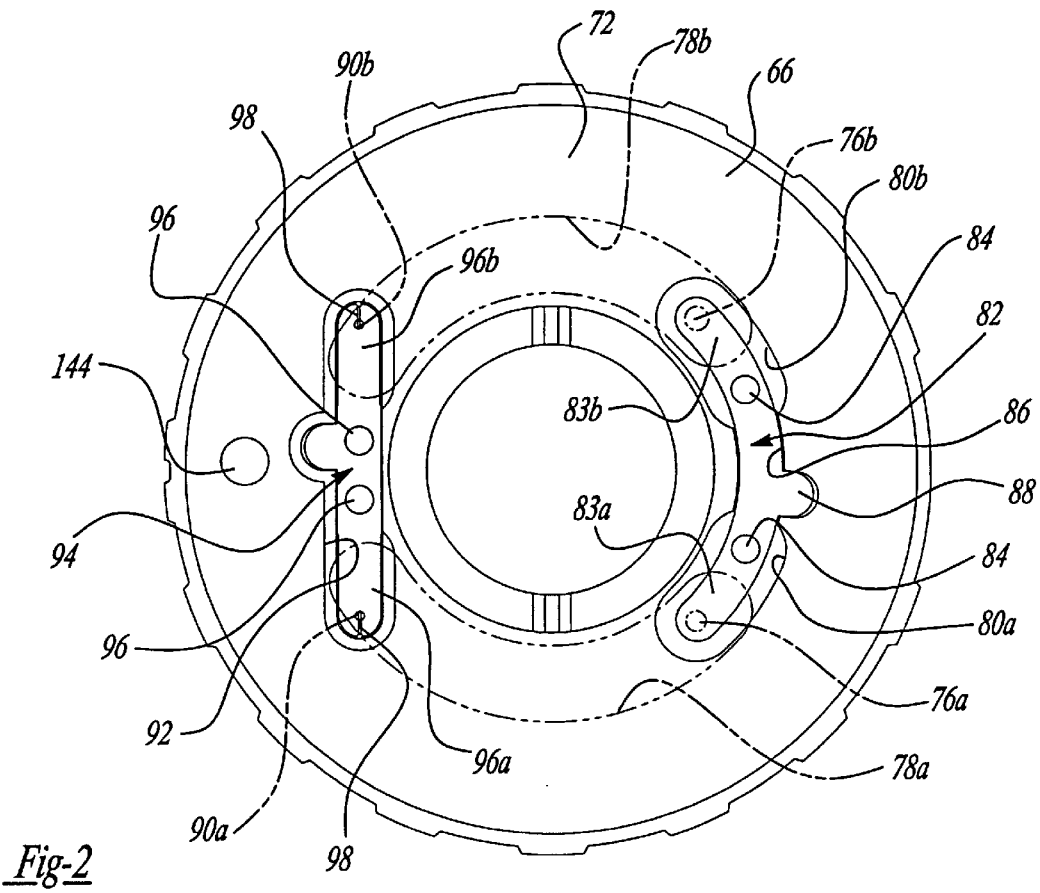
FIG. 2 is an end view showing the piston housing associated with the hydraulic coupling shown in FIG. 1.

As best seen from FIG. 2, piston housing 66 also includes a pair of outlet ports 90a and 90b, which communicate with a corresponding pump outlet slots 78a and 78b and a chamfered bridge slot 92. The valving arrangement associated with piston housing 66 further includes a control valve 94 mounted by rivets 96 within bridge slot 92 and which is operable for setting the predetermined pressure level within piston chamber 72 at which transfer clutch 22 is initially actuated and for compensating for temperature gradients caused during heating of the hydraulic fluid in actuator assembly 20. Control valve 94 is preferably a bimetallic valve element that is normally maintained with both of its terminal ends 96a and 96b in an "open" position displaced from piston housing 66 for permitting flow of hydraulic fluid into piston chamber 72 through one of ports 90a and 90b while also discharging hydraulic fluid from piston chamber 72 to a lower pressure section of pump 24 through the other of outlet ports 90a and 90b. Since control valve 94 is of the laminated bimetallic type, the different thermal expansion coefficients of the laminated valve strips cause the ends of control valve 94 to move as its temperature varies for controlling discharge flow through the corresponding one of outlet ports 90a and 90b regardless of changes in the viscosity of the hydraulic fluid caused by temperature variations. However, once the speed differential exceeds a predetermined ARPM value, the pumping action of hydraulic pump 24 causes the fluid in piston chamber 72 to exceed the predetermined pressure level, whereby terminal end 96b of control valve 94 moves to its "closed" position against piston housing 66 for inhibiting fluid flow through outlet ports 90b. As such, a significant pressure increase occurs in piston chamber 72 which causes piston 70 to actuate transfer clutch 22. As is also seen, terminal ends 96a and 96b of control valve 94 are each formed to include a small bleed passage or slot 98 that permit a small amount of bleed flow out of piston chamber 72 even when control valve 94 is closed. This continuous bleed flow provides a gradual release of the pressure in piston chamber 72 after cessation of the pumping action for disengaging transfer clutch 22. As noted, opposite relative rotation between shafts 12 and 14 will result in the opened and closed positions of terminal ends 96a and 96b of control valve 94 being reversed.

As noted, hydraulic pump 24 is operable for pumping hydraulic fluid through transfer ports 76a and 76b and into piston chamber 72 for actuating transfer clutch 22 in response to the magnitude of the differential rotation ΔRPM between shafts 12 and 14. Hydraulic pump 24 is installed in the sealed actuator chamber and, preferably, is a rotary type bi-directional pump. In this regard, hydraulic pump 24 is shown to include a gerotor pump assembly 100 and a pump housing 102. Gerotor pump assembly 100 is a bi-directional arrangement including a pump ring 104 that is fixed via a splined connection 106 to drive shaft 28, an eccentric ring 108 that is fixed via a splined connection 110 to outer drum 32, and a stator ring 112 that is operably disposed therebetween. Pump ring 104 has a plurality of external teeth 114 that rotate concentrically relative to shaft 14 about a common rotational axis, as denoted by axis line "X". Stator ring 112 includes a plurality of internal lobes 116 and has an outer circumferential edge surface 118 that is journally rotatably supported within a circular internal bore 120 formed in eccentric ring 108. Internal bore 120 is offset from the rotational axis "X" such that, due to meshing of internal lobes 116 of stator ring 112 with external teeth 114 of pump ring 104, relative rotation between pump ring 104 and eccentric ring 108 causes eccentric rotation of stator ring 112. Based on the direction of relative rotation, this eccentric rotary arrangement results in a pumping action for supplying fluid under pressure from one of pump inlet slots 122a and 122b formed in pump housing 102 to a corresponding one of pump outlet slots 78a and 78b formed in piston housing 66. Preferably, stator ring 112 has a number of lobes 116 that is one more than the number of teeth 114 provided on pump ring 104.

Referring primarily to FIG. 1, gerotor pump assembly 100 is shown operably installed between piston housing 66 and pump housing 102. An O-ring seal 123 provides a fluid tight seal between the outer peripheral edges of eccentric ring 108 and piston housing 66. Pump housing 102 is likewise shown to have its outer peripheral surface fixed via a splined connection 124 for rotation with outer drum 32 while its inner peripheral surface is journally supported for rotation relative to drive shaft 28 and is sealed relative thereto by an O-ring seal 126. Pump housing 102 is formed to include a series of inlet ports 128a and 128b formed respectively within pump inlet slots 122a and 122b to provide fluid communication with an internal reservoir defined by annular supply chamber 130 which is located on a supply side of the gerotor pump assembly 100 and is formed in second cover plate 36. Check valves 132a and 132b are mounted by rivets 134 within corresponding pump inlet slots 122a and 122b for controlling the delivery of fluid from supply chamber 130 through inlet ports 128a and 128b to pump inlet slots 122a and 122b. Check valves 132a and 132b are preferably reed valve elements which overlie inlet ports 128a and 128b and which are movable on rivets 134 from a "closed" position abutting pump housing 102 to an "open" position displaced from pump housing 102 in response to pumping action of gerotor pump assembly 100. Rotation in a first direction causes check valve 132a to move to its open position while check valve 132b is maintained in its closed position. Obviously, opposite rotation causes opposite movement of check valves 132a and 132b. Upon cessation of the pumping action, check valves 132a and 132b return to their normally closed positions for maintaining a supply of fluid within inlet slots 122a and 122b.

Figure 3:
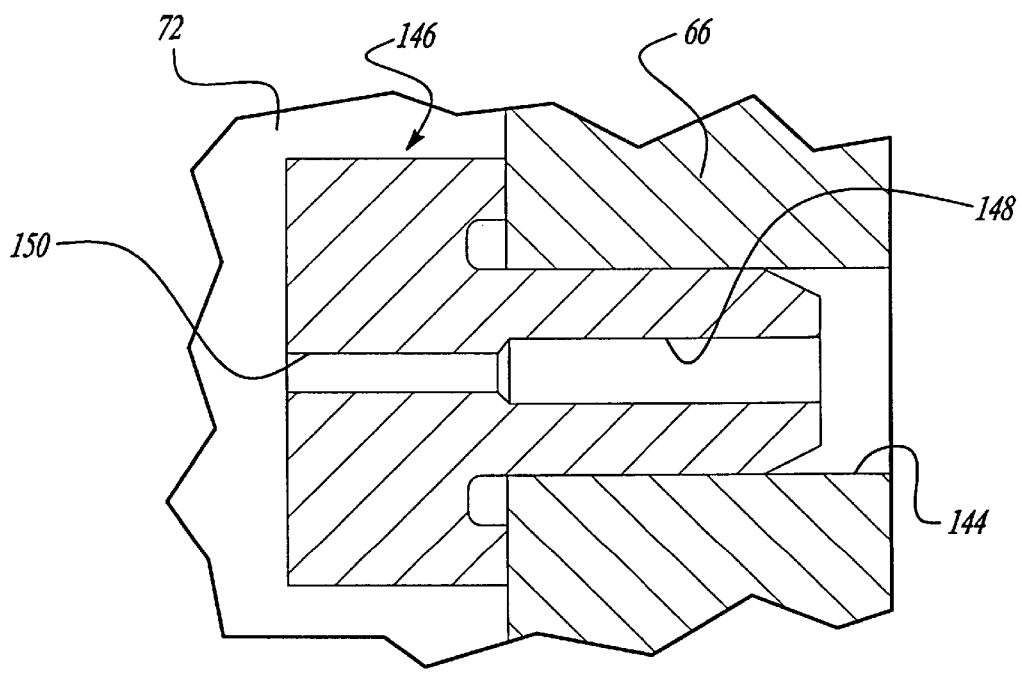
FIG. 3 is an enlarged sectional view of the bleed plug associated with the hydraulic coupling shown in FIG. 1.
Figure 4:
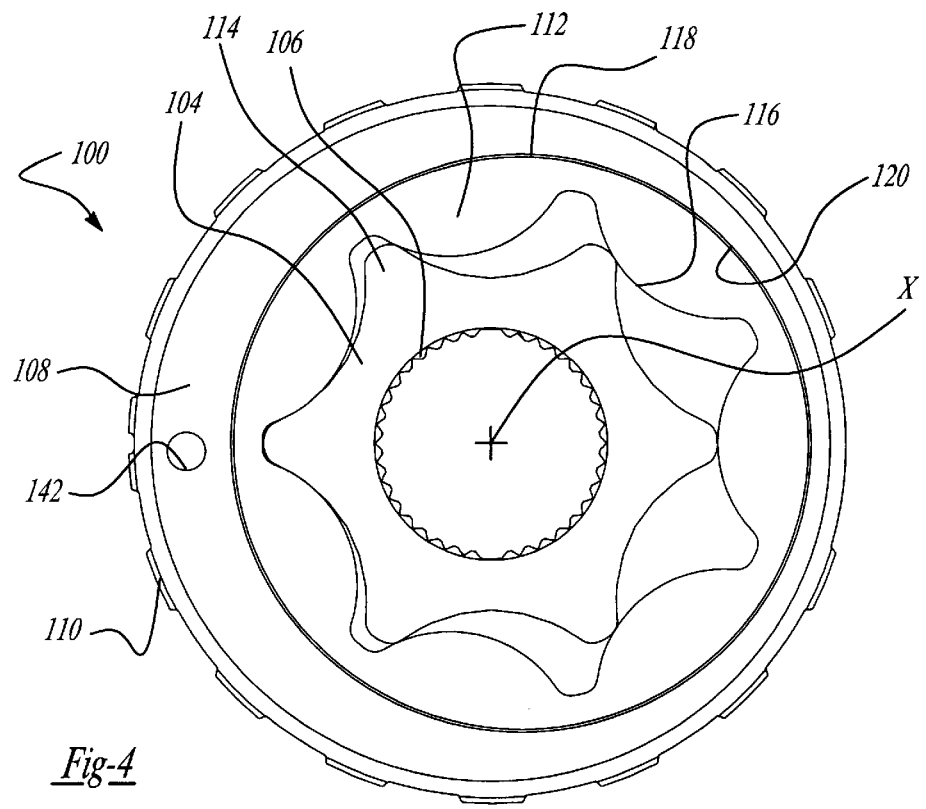
FIG. 4 is a side view showing the components of the hydraulic pump in greater detail.

Hydraulic coupling 10 further includes a fluid path 136 for permitting fluid in the sealed actuator chamber to flow from the piston chamber 72 to supply chamber 130. Fluid path 136 is defined by a series of aligned apertures including an aperture 140 extending axially through inlet plate 102, an aperture 142 extending axially through eccentric ring 108, and an aperture 144 passing axially through piston housing 66. With reference to FIGS. 1 and 3, a bleed plug 146 is shown disposed within aperture 144 in pump housing 66. Plug 146 defines a flow restricting bleed passage which includes a first bore 148 in fluid communication with fluid path 136 and a second bore 150 in fluid communication with first bore 148 and piston chamber 72. By using bleed plug 146, the restricted bleed passage can be formed independently from piston housing 66. Alternatively, it will be appreciated that the restrictive bleed passage can be formed directly in piston housing 66. In the exemplary embodiment, bleed plug 146 is constructed of steel and is welded or otherwise suitably bonded to piston housing 66. The flow area of the bleed passage, 5 as well as the relationship between the size of transfer ports 76, outlet ports 90 and bleed slots 98, in conjunction with the operational characteristics of control valve 94, permit hydraulic coupling 10 to be calibrated (i.e., "tuned") to define the particular speed differential value between shafts 12 and 14 at which torque transfer will begin (i.e., when the clamping force on the clutch pack is of a magnitude to transfer torque). These aspects also may be adjusted to tune the characteristics of such torque transfer due to changes in the speed differential.

In operation, fluid is drawn from supply reservoir 130 into the inlet side of gerotor pump assembly 100 when relative motion between the components of gerotor pump assembly 100 commences. Fluid transfers from supply chamber 130 through one of pump inlet slots 122a and 122b to the high pressure discharge side of gerotor pump assembly 100. The fluid then flows past check valve 94. Within piston chamber 72, the fluid is routed back into the inlet side of gerotor pump assembly 100 via control valve 94 or is bled back toward supply reservoir 130 via fluid path 136. Once the fluid reaches supply reservoir 130, it remains there until once again drawn into the inlet side of gerotor pump assembly 100.

Driveline apparatus 11 is shown in FIG. 1 to further include a lube pump 154 that is operable for drawing lubricant fluid from a sump provided within apparatus 11 and supplying the lubricant fluid to cool the clutch pack. In particular, lube pump 154 is a shaft-driven hydraulic pump, such as a gerotor pump, which pumps lubricant fluid into a fluid pathway in shaft 14 for delivery to hub port 60. The fluid pathway is shown to include a radial bore 156, a central longitudinal bore 158 and radial ports 160. A plug 162 with an orifice 164 is retained in bore 158 to direct fluid into radial ports 160 without pressurizing the clutch pack while still lubricating and cooling the clutch pack. Since actuator assembly 20 is sealed relative to transfer clutch 22, the hydraulic fluid within the actuator chamber is of different type than that used in the sump of driveline apparatus 11.

Figure 5:
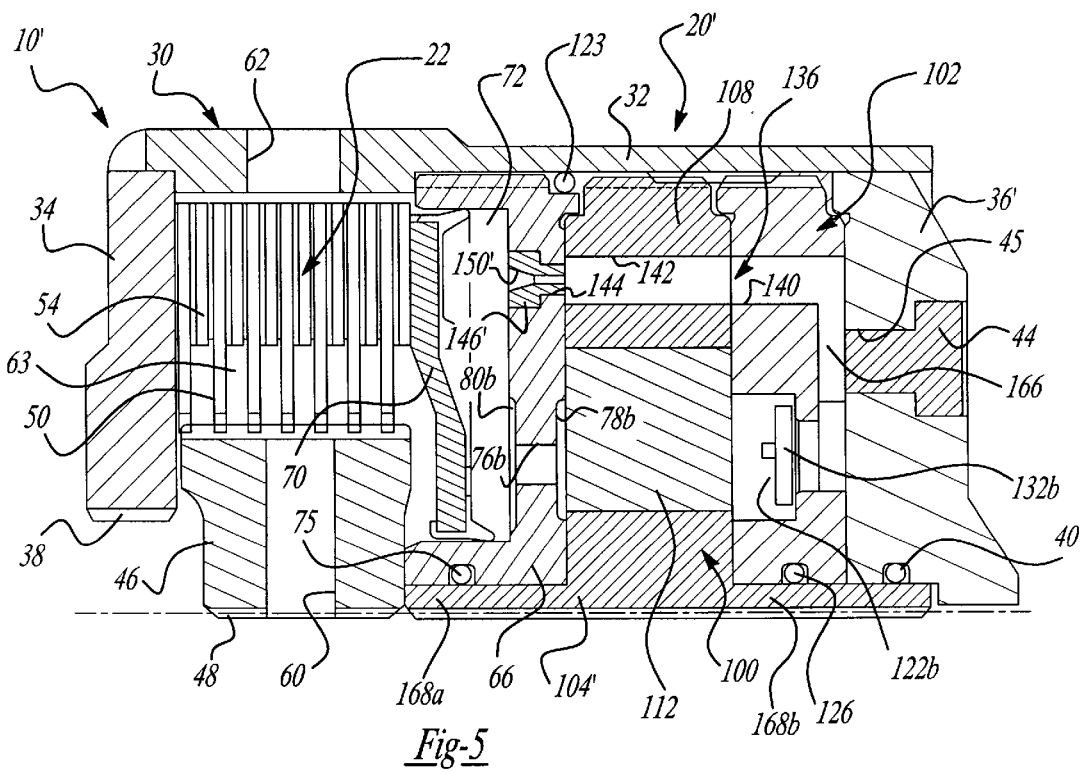
FIG. 5 is a partial sectional view of a hydraulic coupling according to an alternative embodiment of the present invention.

Referring to FIG. 5, a portion of a hydraulic coupling 10' constructed in accordance with a first alternative embodiment of the present invention is illustrated. Common reference numerals between hydraulic couplings 10' are used to identify common elements. For brevity, the description of the hydraulic coupling 10' will be limited to the most significant differences therebetween. Hydraulic coupling 10' is shown to include a supply chamber 166 which is formed in pump housing 102 instead of in second cover plate 36'. In addition, drive shaft 28 has been integrated with pump ring 104' which now has first and second shaft segments 168a and 168b that are adapted to be splined directly to shaft 14 and on which piston housing 66 and pump housing 102 are journally supported. Seals 40, 75 and 126 are again used to provide fluid tight seals for defining a self-contained actuator assembly 20'. Also, plug 146' is shown to have a larger second bore 150' and a smaller first bore 148' for defining the bleed passage.

Figure 6:
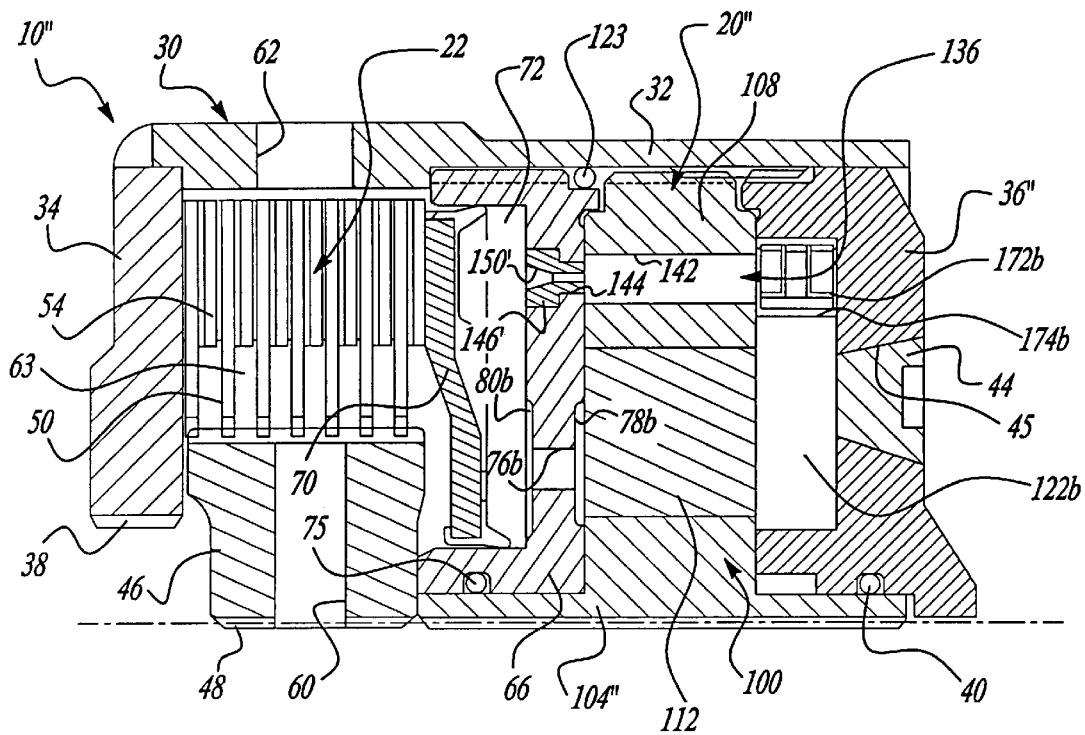
FIG. 6 is a partial sectional view of a hydraulic coupling according to another alternative embodiment of the present invention.
Figure 7:
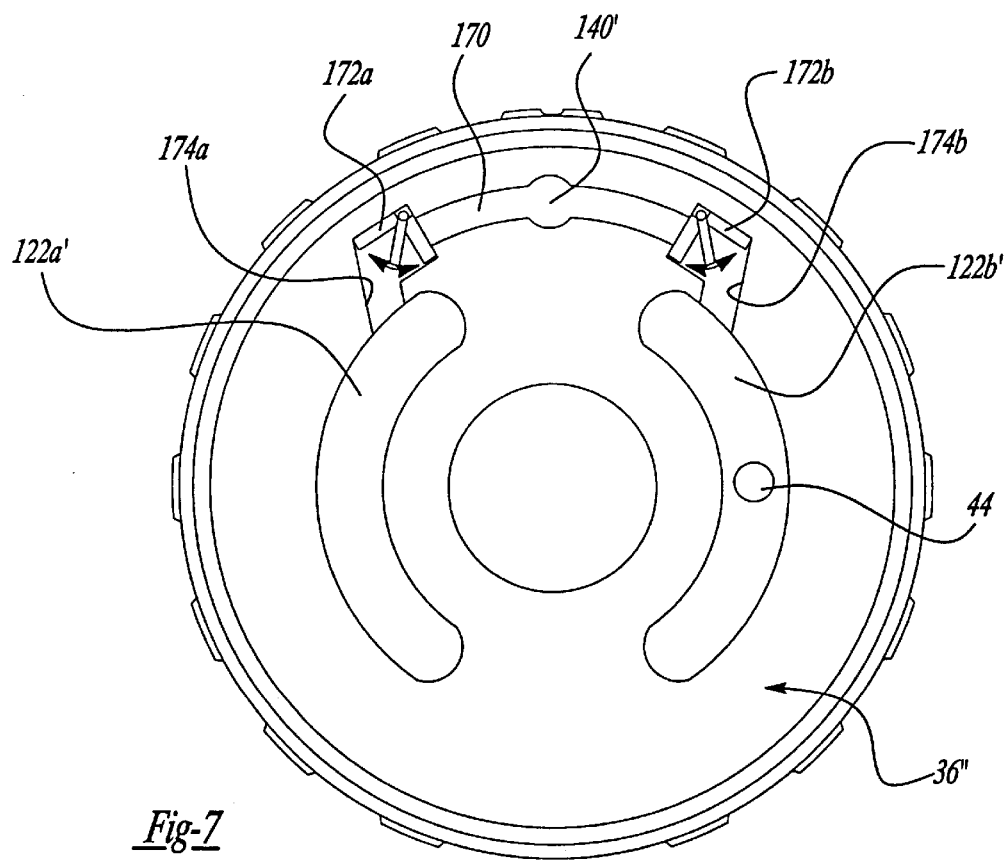
FIG. 7 is a side view of the rear cover plate associated with the hydraulic coupling shown in FIG. 6.

Referring now to FIGS. 6 and 7, a hydraulic coupling 10" constructed in accordance with a second alternative embodiment will now be described. Again, common reference numerals will be used to identify common elements. Hydraulic coupling 10" differs from the previously described embodiments in that pump housing 102 has been eliminated for purposes of simplifying the structure. To accommodate the absence of pump housing 102, second cover plate 36" now includes a return aperture 140' which communicates with an arcuate slot 170 having flapper-type check valves 172a and 172b mounted in valve chambers 174a and 174b adjacent to the ends of slot 170. Valve chambers 174a and 174b communicate with corresponding pump inlet slots 122a' and 122b'. Based on the direction of gerotor pump assembly 100, one of flapper valves 172a and 172b closes its corresponding end of slot 170 while the other one moves to a position opening the opposite end of slot 170. In this manner, a circuitous flow path is provided within sealed actuator assembly 20".

Figure 8:
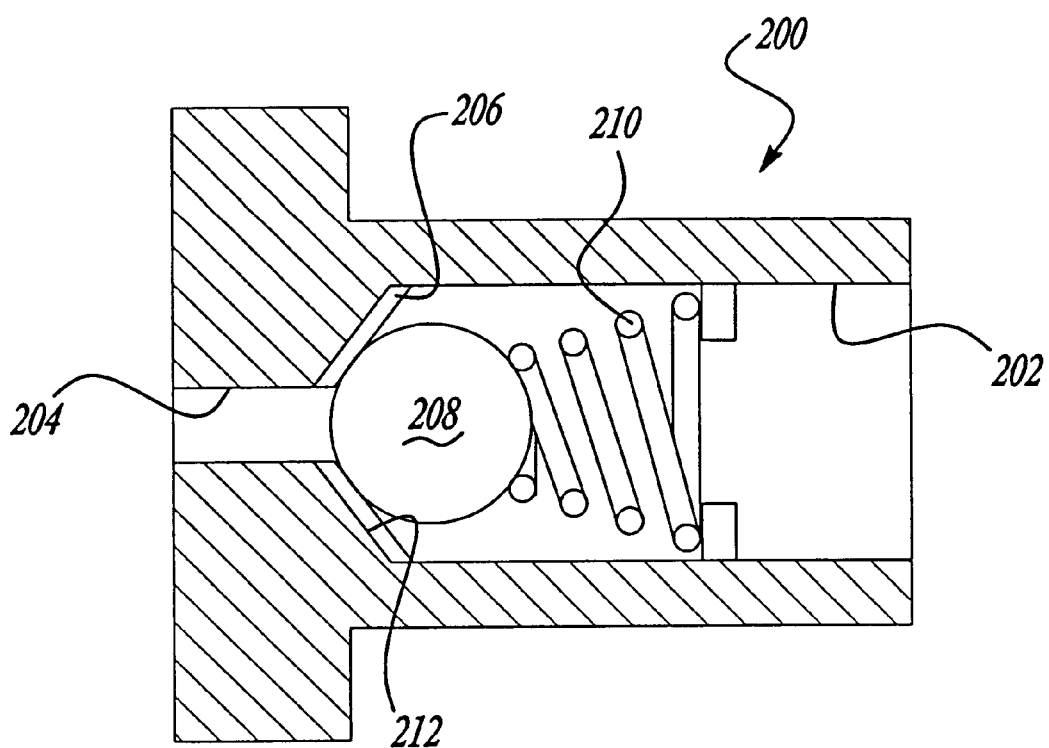
FIG. 8 is a sectional view of an alternative construction for the bleed plug shown in FIG. 3.

Referring now to FIG. 8, an alternative construction for a bleed plug 200 is shown which can be substituted for plugs 146 and 146' associated with the various hydraulic couplings disclosed herein. Bleed plug 200 has a first bore 202 adapted to communicate with fluid path 136 and a second bore 204 adapted to communicate with pressure chamber 72. A valve seat 206 is formed in the transition between bores 202 and 204. A ball valve 208 is normally biased by a spring 210 into engagement with seat 206. A series of by-pass slots 212 are formed in valve seat 206 to permit fluid to flow into first bore 202 when valve ball 208 is seated against valve seat 206, thereby providing a bleed passage. When the fluid pressure exceeds a predetermined maximum value in piston chamber 72, ball valve 208 is moved off of valve seat 206. Thus, bleed plug 200 is a combination flow restrictor valve for allowing continuous bleed flow and a pressure regulator valve for preventing over pressure conditions in the hydraulic coupling.

Based on this disclosure, those skilled in the art should appreciate that any of the hydraulic coupling constructed according to the present invention can be used in all motor vehicle driveline applications for limiting slip and transferring torque between two relatively rotatable members. In this regard, driveline apparatus 11 is intended to be indicative of, but not limited to, axle differentials, transaxles differentials, all-wheel drive power take-offs and in-line couplings, on-demand transfer cases and the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulic coupling comprising:
   first and second rotary members;
   a transfer clutch operatively connected between said first and second rotary members; and
   a self-contained actuator assembly for engaging said transfer clutch in response to speed differentiation between said first and second rotary members, said actuator assembly including a drive shaft fixed for rotation with said first rotary member, and a housing fixed for rotation with said second rotary member which is sealed relative to said drive shaft to define an actuator chamber, said actuator chamber is filled with hydraulic fluid and includes a supply chamber and a piston chamber, said actuator assembly further including a hydraulic pump located in said actuator chamber to provide a pumping action in response to relative rotation between said first and second rotary members for pumping fluid from said supply chamber into said piston chamber, a piston disposed in said piston chamber and actuatable to engage said transfer clutch for rotatively coupling said first and second rotary members, a flow path between said piston chamber and said supply chamber, and a flow restrictor mounted in said flow path for regulating the flow of hydraulic fluid from said piston chamber into said supply chamber.

2. The hydraulic coupling of claim 1 wherein said housing includes an outer drum, an end plate fixed to said outer drum which is sealed relative to said drive shaft, and a piston housing disposed within said outer drum and which is sealed relative to said drive shaft, said supply chamber being located between said hydraulic pump and said end plate, and said piston housing having a transfer port for supplying fluid from said hydraulic pump to said piston chamber, and wherein said flow path includes a flow aperture through said piston housing for providing fluid communication between said piston chamber and said supply chamber, and said flow restrictor is a bleed plug mounted in said flow aperture and having a bleed passage providing a flow restriction between said piston chamber and said supply chamber.

3. The hydraulic coupling of claim 2 wherein said bleed passage in said bleed plug includes a first bore and a second bore of different sizes.

4. The hydraulic coupling of claim 3 wherein said bleed plug includes a valve seat between said first and second bores, a valve member, and a spring for biasing said valve member to a first position against said valve seat to inhibit flow from said first bore into said second bore, said valve member is movable to a second position displaced from said valve seat when the fluid pressure in said piston chamber exceeds a predetermined maximum value.

5. The hydraulic coupling of claim 2 wherein said hydraulic pump includes a first pump component fixed for rotation with said drive shaft and a second pump component fixed for rotation with said outer drum, and wherein said flow path includes a second flow aperture formed through said second pump component and which provides fluid communication between said flow aperture in said piston housing and said supply chamber.

6. The hydraulic coupling of claim 5 wherein said supply chamber is formed in said end plate, and further including a check valve for permitting fluid to flow from said second flow aperture into said supply chamber while preventing flow from said supply chamber into said second flow aperture.

7. The hydraulic coupling of claim 5 wherein said supply chamber is formed in said end plate, and wherein said housing further includes an inlet plate fixed to said outer drum and sealed relative to said drive shaft, said inlet plate having a third flow aperture which provides fluid communication between said second flow aperture and said supply chamber.

8. The hydraulic coupling of claim 5 wherein said housing further comprises an inlet plate fixed to said outer drum with said supply chamber formed in said inlet plate, said inlet plate including a third flow aperture providing fluid communication between said second flow aperture and said supply chamber.

9. A hydraulic coupling comprising:

first and second rotary members;

a transfer clutch operatively connected between said first and second rotary members;

a cover assembly coupled for rotation with said first rotary member and defining an actuator chamber which is sealed relative to said second rotary member;

a piston housing located within said actuator chamber and defining a piston chamber and a transfer port in fluid communication with said piston chamber;

a piston disposed in said piston chamber for movement relative to said transfer clutch for exerting a clutch engagement force thereon the magnitude of which is a function of the fluid pressure in said piston chamber;

an inlet plate disposed in said actuator chamber and defining a supply chamber with said cover assembly;

a hydraulic pump disposed in said actuator chamber and including a first pump component coupled for rotation with said first rotary member and a second pump component coupled for rotation with said second rotary member, said hydraulic pump operative for pumping fluid from said supply chamber to said piston chamber through said transfer port in response to speed differentiation between said first and second rotary members;

a control valve operable for regulating flow through said transfer port into said piston chamber;

a flow path between said piston chamber and said supply chamber; and a flow restrictor mounted in said flow path for regulating flow of hydraulic fluid therethrough.

10. The hydraulic coupling of claim 9 wherein said flow path includes a flow aperture through said piston housing, and wherein said flow restrictor is a bleed plug mounted in said flow aperture and having a bleed passage providing a flow restriction between said piston chamber and said supply chamber.

11. The hydraulic coupling of claim 10 wherein said bleed passage in said bleed plug includes a first bore and a second bore of different sizes.

12. The hydraulic coupling of claim 11 wherein said bleed plug includes a valve seat between said first and second bores, a valve member, and a spring for biasing said valve member to a first position against said valve seat to inhibit flow from said first bore into said second bore, said valve member is movable to a second position displaced from said valve seat when the fluid pressure in said piston chamber exceeds a predetermined maximum value.

13. The hydraulic coupling of claim 10 wherein said flow path includes a second flow aperture formed through said first pump component and which provides fluid communication between said flow aperture in said piston housing and said supply chamber.

14. The hydraulic coupling of claim 13 wherein said cover assembly includes an outer drum fixed to said first rotary member and an end plate that is fixed to said outer drum and sealed relative to said second rotary member, and wherein said supply chamber is formed in said end plate, said hydraulic coupling further including a check valve for permitting fluid to flow from said second flow aperture into said supply chamber while preventing flow from said supply chamber into said second flow aperture.

15. The hydraulic coupling of claim 13 wherein said cover assembly includes an outer drum fixed to said first rotary member and an end plate that is fixed to said outer drum and sealed relative to said second rotary member, and wherein said supply chamber is formed in said end plate, said hydraulic coupling further including an inlet plate fixed to said outer drum and sealed relative to said second rotary member, said inlet plate having a third flow aperture which provides fluid communication between said second flow aperture and said supply chamber.

16. The hydraulic coupling of claim 13 further including an inlet plate located in said actuator chamber and wherein said supply chamber is formed in said inlet plate, said inlet plate including a third flow aperture providing fluid communication between said second flow aperture and said supply chamber.

17. A hydraulic coupling comprising:

a first shaft;

a second shaft;

a cover assembly including an outer drum, a first end plate fixed to one end of said outer drum and coupled for rotation with said first shaft, and a second end plate fixed to the opposite end of said outer drum and sealed relative to said second shaft;

a clutch assembly located within said cover assembly and including a first clutch plate fixed for rotation with said outer drum and a second clutch plate fixed for rotation with said second shaft;

a piston housing located in said cover assembly and sealed relative to said second shaft, said piston housing defining a piston chamber;

a piston disposed in said piston chamber and movable to exert a clamping force on said first and second clutch plates to actuate said clutch assembly and rotatively couple said second shaft to said first shaft;

a hydraulic pump located within said cover assembly between said piston housing and said second end plate, said hydraulic pump including a first pump component fixed for rotation with said outer drum and a second pump component fixed for rotation with said second shaft, said hydraulic pump operable for generating a pumping action in response to relative rotation between its first and second pump components;

a first flow path between a supply chamber and an inlet to said hydraulic pump;

a second flow path between an outlet to said hydraulic pump and said piston chamber;

a third flow path between said piston chamber and said supply chamber; and a bleed plug mounted in said third flow path and having a bleed passage for generating a flow restriction between said piston chamber and said supply chamber.

18. The hydraulic coupling of claim 17 further comprising a fill port in said second end plate and a plug mounted in said fill port.

19. The hydraulic coupling of claim 17 wherein said bleed passage in said bleed plug includes a first bore and a second bore of different sizes.

20. The hydraulic coupling of claim 19 wherein said bleed plug includes a valve seat between said first and second bores, a valve member, and a spring for biasing said valve member to a first position against said valve seat to inhibit flow from said first bore into said second bore, said valve member is movable to a second position displaced from said valve seat when the fluid pressure in said piston chamber exceeds a predetermined maximum value.

21. The hydraulic coupling of claim 17 wherein said third flow path includes a first flow aperture through said piston housing that is in fluid communication with said piston chamber and a second flow aperture through said first pump component that is in fluid communication with said first flow aperture and said supply chamber.

22. The hydraulic coupling of claim 21 further comprising an inlet plate located within said cover assembly and sealed relative to said second shaft, said third flow path further including a third flow aperture through said inlet plate that is in fluid communication with said second flow aperture and said supply chamber.

* * * * *

UNITED STATES PATENT AND TRADEMARK OFFICE
CERTIFICATE OF CORRECTION

PATENT NO : 6,076,646

DATED : June 20, 2000

INVENTOR(S) : Timothy M. Burns

It is certified that error appears in the above-identified patent and that said Letters Patent are hereby corrected as shown below:

ON THE TITLE PAGE, Under U.S. Application Data, insert --Provisional Application No. 60/064,704, November 7, 1997--.

Column 3, line 48, "ARPM" should be --ΔRPM--.

Column 4, line 53, "ARPM" should be --ΔRPM--.

Signed and Sealed this

Twenty-second Day of May, 2001

NICHOLAS P. GODICI

Attest:

Attesting Officer

Acting Director of the United States Patent and Trademark Office